United States Patent [19]

Wang

[11] Patent Number: 5,604,769
[45] Date of Patent: Feb. 18, 1997

[54] HYBRID EQUALIZER ARRANGEMENT FOR USE IN DATA COMMUNICATIONS EQUIPMENT

[75] Inventor: Jin-Der Wang, Ocean, N.J.

[73] Assignee: Lucent Technologies Inc., Murray Hill, N.J.

[21] Appl. No.: 322,878

[22] Filed: Oct. 13, 1994

[51] Int. Cl.$^6$ .................................................. H04L 27/01
[52] U.S. Cl. ........................... 375/229; 375/231; 375/233
[58] Field of Search ..................................... 375/229, 231, 375/233; 364/724.2

[56] References Cited

U.S. PATENT DOCUMENTS

| | | | |
|---|---|---|---|
| 5,249,200 | 9/1993 | Chen et al. | 375/58 |
| 5,388,124 | 2/1995 | Laroia et al. | 375/265 |
| 5,414,733 | 5/1995 | Turner | 375/233 |
| 5,446,758 | 8/1995 | Eyuboglu | 375/265 |
| 5,455,839 | 10/1995 | Eyuboglu | 375/265 |
| 5,488,633 | 1/1996 | Laroia | 375/262 |
| 5,513,216 | 4/1996 | Gadot et al. | 375/231 |

OTHER PUBLICATIONS

IEEE, "Approximate maximum likelihood sequence estimators for time dispersive channels", N. A. Zervos, et al., 1983 International Electrical, Electronics Conference Proceedings, pp. 62–65, vol. 1; Publication Date: 1983.

ISCAS, "Design and Performance of an All–Digital Adaptive 2.048 MBIT/S Data Transmission System Using Noise Prediction", Graf et al., ISCAS 1989, pp. 1808–1812.

*Primary Examiner*—Melvin Marcelo
*Attorney, Agent, or Firm*—Joseph J. Opalach

[57] ABSTRACT

A hybrid type of decision feedback equalizer (DFE) structure that approaches optimal DFE performance is described. The hybrid DFE includes both an intersymbol interference DFE (ISI-DFE) and a noise predictive DFE (NP-DFE). In particular, an adaptive feedforward filter section is followed by both an intersymbol interference (ISI) predictive filter and a noise predictive (NP) filter. The corresponding transmitter uses a precoder that utilizes optimal coefficient values, denoted as C(z), of the hybrid DFE structure. In particular, C(z) is equal to (1+I(z)) (1+N(z))−1, where, the notation I(z) and N(z), as known in the art, represent the resulting coefficient values after adaptation of the ISI-DFE and the NP-DFE, respectively.

5 Claims, 7 Drawing Sheets

HYBRID EQUALIZER ARRANGEMENT FOR USE IN DATA COMMUNICATIONS EQUIPMENT

CROSS-REFERENCE TO RELATED APPLICATION

Related subject matter is disclosed in the commonly assigned, U.S. patent application of: Gadot et al., entitled "A Hybrid Equalizer Arrangement for Use in Data Communications Equipment," Ser. No. 08/322,877, filed on Oct. 13, 1994 now U.S. Pat. No. 5,513,216.

BACKGROUND OF THE INVENTION

The present invention relates to data communications equipment, e.g., modems, and, more particularly, to the equalization of signals in a data communications system.

To varying degrees, inter-symbol interference (ISI) is always present in a data communications system. ISI is the result of the transmission characteristics of the communications channel, i.e., the "channel response," and, generally speaking, causes neighboring data symbols, in a transmission sequence, to spread out and interfere with one another. If the channel response is bad, or severe, ISI becomes a major impediment to having low error rate communications between two data endpoints. In fact, at higher data rates, i.e., frequencies, the affect of ISI is more severe since there is more high frequency attenuation in the transmission channel. Consequently, current efforts to push transmission speeds higher and higher in the local loop environment must effectively contend with ISI effects on a transmitted data signal to be successful.

As known in the art, ISI is typically removed by a decision feedback equalizer (DFE) in a receiver. There are theoretically two mathematically equivalent forms of DFEs. One is the ISI predictive DFE (ISI-DFE), the other is the noise predictive DFE (NP-DFE). Although mathematically equivalent, in practice there are limits on the performance of each, limits that become noticeable in high speed communications systems. In particular, the performance of both the ISI-DFE and the NP-DFE are affected by noise introduced from the communications channel, i.e., channel noise, and error propagation.

In the case of an ISI-DFE, there is a feedforward filter section and an ISI predictive feedback filter section, each of which removes a portion of the ISI. Unfortunately, the channel noise after processing by the feedforward filter section may appear slightly colored, not white. That is, the feedforward filter section does not necessarily converge to an ideal pre-whitening solution using a typical adaptation algorithm. This colored noise provided by the feedforward filter section causes performance degradation. In other words, the ISI-DFE performance is limited, i.e., sub-optimal.

Alternatively, as described above, a receiver may use an NP-DFE. The latter includes a linear equalizer followed by an NP feedback filter section. The linear equalizer theoretically removes all of the ISI, while the NP feedback section removes any colored channel noise. However, in the design of a linear equalizer there is a trade-off between noise enhancement and ISI compensation—this trade-off is represented by use of a "minimum mean squared error" (MMSE) criteria in the linear equalizer to remove the ISI. Consequently, the signal provided by the linear equalizer always has a residual form of ISI present. This residual form of ISI causes performance degradation so that even an NP-DFE does not provide the optimal DFE performance. It should be noted that an alternative "zero-forcing" criteria can be used in the linear equalizer to force the ISI to zero. However, this zero-forcing approach is only practical if there is no spectral null in the channel response.

Notwithstanding the above described practical limitations to the use of either an ISI-DFE or an NP-DFE, some in the art have realized there is some benefit to using a hybrid type of structure to improve DFE performance. For example, in the article "Design and Performance of an All-Digital Adaptive 2.048 MBIT/S Data Transmission System Using Noise Prediction", Graf et al. ISCAS 1989 pp. 1808–1812, the DFE includes a symbol-spaced pre-cursor only adaptive zero forcing feedforward filter followed by a least mean squares (LMS) ISI predictive filter and an LMS noise predictive filter in parallel. In this case, the use of the ISI predictive filter and the noise predictive filter compensate for the use of the symbol-spaced pre-cursor only zero forcing feedforward filter. Unfortunately, the use of the symbol-spaced pre-cursor only zero forcing feedforward filter does not provide optimal DFE performance in the presence of channel distortion and noise. Furthermore, the Graf et al. article teaches that the use of an LMS algorithm for all three filters cannot guarantee the steady-state performance. Consequently, although this hybrid type of structure is useful in this particular communications environment, it is not the complete answer to the problem of approaching optimal DFE performance in the presence of channel noise in a high speed communications system.

Further, as mentioned-above, the use of an ISI-DFE or a NP-DFE, introduces "error propagation" effects in the receiver. Both the ISI-DFE and the NP-DFE make a decision, i.e., an estimate, as to the correct data symbol. Since both the ISI-DFE and the NP-DFE utilize feedback, an incorrect estimate as to the current received symbol affects subsequent received symbols. Generally, the prior art teaches that precoding is used to remove the affects of error propagation. In the case of a receiver with an ISI-DFE, the prior art teaches that the resulting coefficient values of the ISI-DFE—as represented by the notation $I(z)$, as known in the art—are transmitted back to the transmitter, e.g., over a reverse channel, for use by a transmitter in precoding. Similarly, in the case of a receiver with a NP-DFE, the prior art teaches that the $N(z)$ coefficient values are transmitted back to the transmitter. Unfortunately, in the case of a hybrid DFE, the obvious combination of $I(z)+N(z)$ does not provide the optimal solution for precoding in the transmitter.

SUMMARY OF THE INVENTION

When using a hybrid type of DFE structure in a receiver, I have discovered a set of coefficient values for use by a transmitter to further reduce the affects of error propagation when precoding a data signal. In particular, the transmitter uses a precoder that utilizes a coefficient value, denoted as $C(z)$, of the hybrid DFE structure. In particular, $C(z)$ is equal to:

$$(1+I(z))(1+N(z))-1,$$

where, the notation $I(z)$ and $N(z)$, as known in the art, represent the resulting coefficient values after adaptation of the ISI-DFE and the NP-DFE, respectively.

In an embodiment of the invention, Tomlinson precoding is used to minimize error propagation, where the Tomlinson precoder utilizes coefficient values equal to: $(1+I(z))(1+N(z))-1$.

DETAILED DESCRIPTION

Figure 1:
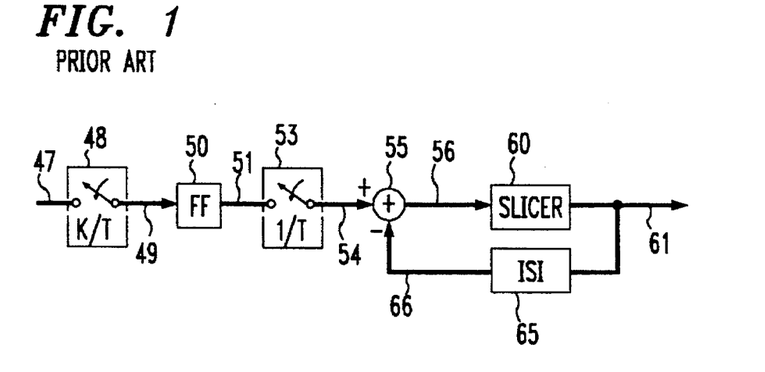
FIG. 1 is a block diagram of a prior art ISI-DFE.

Before describing the inventive concept, some additional background information is presented. FIG. 1 shows a prior art ISI-DFE that includes feedforward filter 50, adder 55, slicer 60, and ISI feedback filter 65. A received data signal for processing is applied to feed forward filter 50, via sampler 48 and line 49. Feedforward filter 50 removes a portion of the ISI present in the received data signal. The output signal from feedforward filter 50 is applied, via sampler 53, to adder 55, which, theoretically, subtracts the remaining portion of ISI removed by ISI feedback filter 65. Adder 55 provides a signal on line 56 to slicer 60. The latter selects a particular data symbol as a function of the mapping of the signal on line 56 into a predefined constellation of data symbols (not shown). Slicer 60 provides a data symbol every T seconds, where 1/T is the data symbol rate. This data symbol is an estimate of the transmitted symbol and is provided by slicer 60 on line 61 for processing by other receiver circuitry (not shown) to recover the actually transmitted data. (If it a coded signal such as trellis coding, the value at the input of the slicer is used in a Viterbi decoder). In addition, this estimate of the transmitted symbol is also provided to ISI feedback filter 65. The latter uses this estimate to predict the amount of ISI to remove from the received signal. As long as this estimate of the currently transmitted symbol is, in fact, correct, there is no problem. However, if the estimate of the currently transmitted symbol is wrong, then the feedback section adds this error to the next received symbol and error propagation occurs. As a result, as known in the art, a form of non-linear precoding is typically used to minimize error propagation.

In precoding there are two phases of receiver operation. In the first phase, the "start-up," or "training," phase, the ISI-DFE of the receiver adapts to a standard test signal received from a transmitter. Typically, there is no precoding of this test signal by the transmitter. Once the ISI-DFE adapts, the resulting coefficient values of the ISI-DFE —as represented by the notation I(z), as known in the art are transmitted back to the transmitter, e.g., over a reverse channel. At this point, the second phase, i.e., the "communications" phase is entered. In the communications phase, the transmitter now precodes the data before transmission using any of the well-known precoding techniques, e.g., Tomlinson precoding. Whatever precoding method is used, the precoding technique utilizes the above-mentioned coefficient values, I(z), as determined by the ISI-DFE in the receiver. Similarly, the receiver processes any received signal in a complementary fashion to remove the precoding. However, typically, the ISI-DFE section is no longer used during the communications phase since the precoding in the transmitter is equivalently performing the feedback function and error propagation is no longer a problem.

Figure 2:
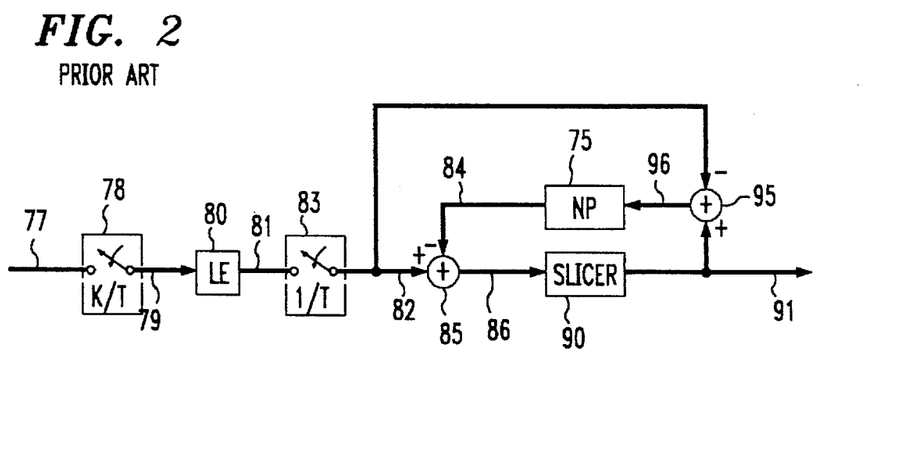
FIG. 2 is a block diagram of a prior art NP-DFE.

Similarly, a prior art NP-DFE structure is shown in FIG. 2. This NP-DFE structure includes linear equalizer (LE) 80, adder 85, slicer 90, adder 95, and NP feedback filter 75. A received data signal for processing is applied to LE 80, via sampler 78 and line 79. LE 80 theoretically removes all but a residual portion of the ISI present in the received data signal. The output signal from LE 80 is applied, via sampler 83, to adder 85, which, theoretically, subtracts the remaining predictive portion of channel noise estimated by NP feedback filter 75. Adder 85 provides a signal on line 86 to slicer 90. The latter selects a particular data symbol as a function of the mapping of the signal on line 86 into a predefined constellation of data symbols (not shown). Slicer 90 provides a data symbol every T seconds, where 1/T is the data symbol rate. This data symbol is an estimate of the transmitted symbol and is provided by slicer 90 on line 91 for processing by other receiver circuitry (not shown) to recover the actually transmitted data. (If it is a coded signal such as trellis coding, the value at the input of the slicer is used in a Viterbi decoder). In addition, this estimate of the transmitted symbol is also provided to adder 95. The latter subtracts the estimate of the transmitted symbol from the ISI-reduced signal present on line 81 to provide an input signal to NP feedback filter 75. The latter uses this estimate to predict the amount of channel noise to remove from the received signal. However, like the ISI-DFE described above, error propagation is a problem, which is typically solved by the use of non-linear precoding in a transmitter that uses the N(z) coefficient values. However, there is a slight difference in the receiver structure during the communications phase when a transmitter uses precoding based on a NP-DFE receiver. In particular, the receiver structure is changed to one in which the linear equalizer is followed by a filter incorporating a 1+N(z) response. However, like the ISI-DFE precoding described above, the NP-DFE is typically no longer used.

Figure 3:
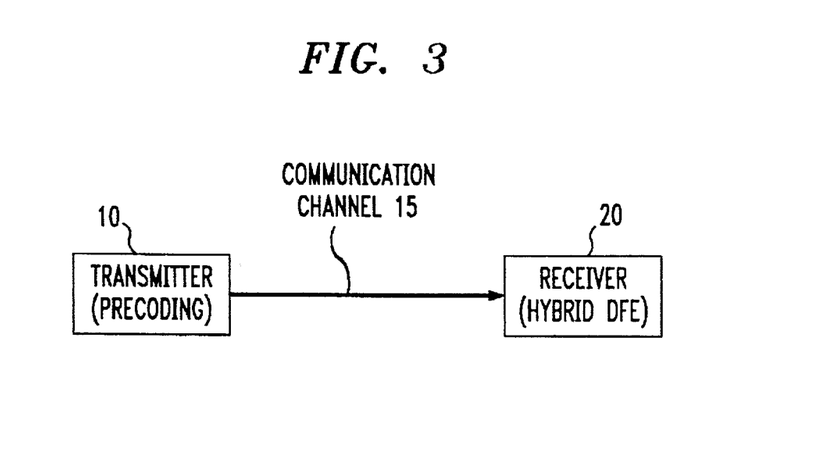
FIG. 3 is a block diagram of a communications system that embodies the principles of the invention.

An illustrative communications system embodying the principles of the invention is shown in FIG. 3. For the purpose of this example, only one direction of transmission is shown, i.e., transmitter 10 transmits a signal to receiver 20, via communications channel 15. Transmitter 10 includes a precoder, and receiver 20 includes a hybrid DFE.

Figure 4:
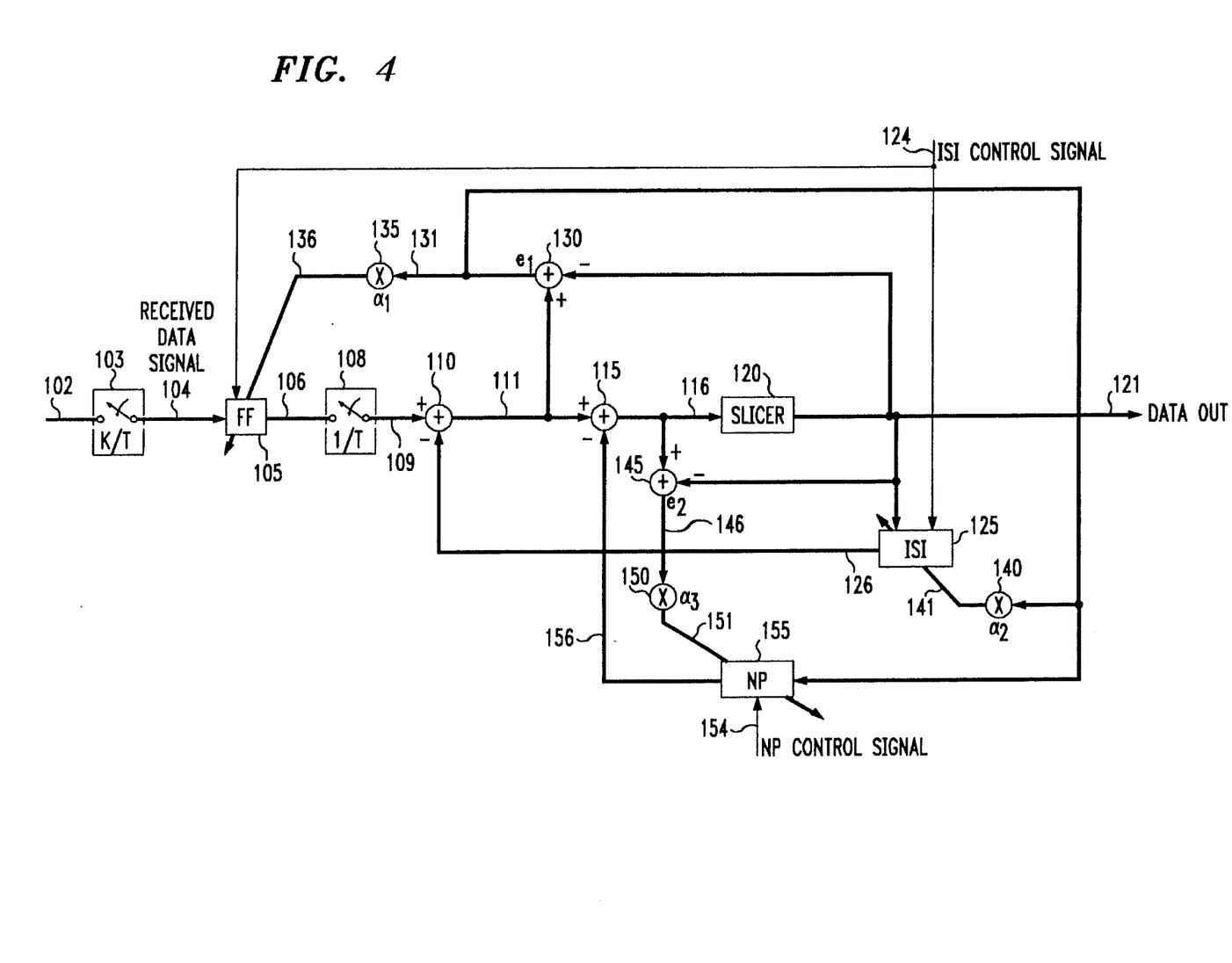
FIG. 4 is a block diagram of a hybrid DFE structure embodying the principles of the invention.

An illustrative hybrid DFE structure embodying the principles of the invention is shown in FIG. 4 for use in receiver 20. In particular, the hybrid DFE structure includes an adaptive feedforward filter section that is followed by both an ISI predictive filter and a noise predictive filter in parallel. The other elements of the receiver are excluded from FIG. 4 for simplicity. Other than the inventive concept, the components of FIG. 4 are well-known and will not be described in detail. For example, feed forward filter section (FF) 105 is typically a fractionally spaced equalizer and can also be a symbol-spaced equalizer for lesser performance and hardware complexity. Although broken out for clarity, as known in the art, sampler 108 is a part of the fractionally spaced equalizer. The outputs of a filtering process are dependent upon the filter coefficients, which, in the case of FF 105, are represented by the notation F(z), as known in the art.

During a start-up phase, a received training signal is applied to FF 105, via sampler 103 and line 104, for processing. In accordance with the inventive concept, FF 105 is an adaptive filter, whose coefficients, F(z), are changed as a function of the adaptation signal present on line 136, described below. FF 105 removes a portion of the ISI present in the received data signal. Although use of an adaptive filter generally improves the performance of a hybrid DFE, the above-mentioned U.S. patent application of Gadot et al. recognizes that this performance can approach the optimal performance if care is taken as to the design of the feedforward filter section and how the hybrid DFE adapts.

Figure 5:
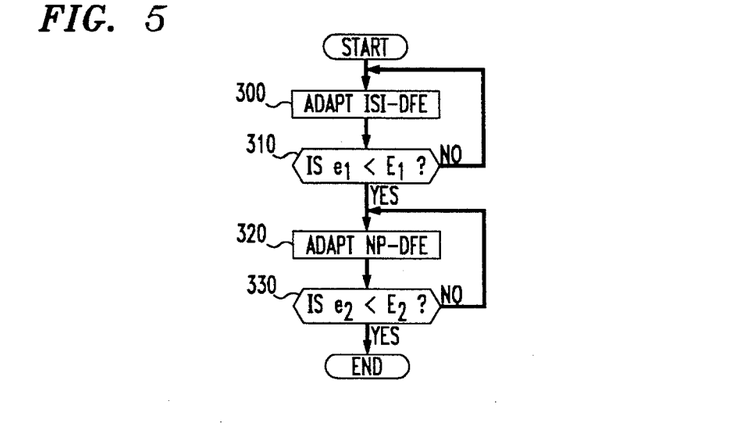
FIG. 5 is an illustrative flow diagram of an adaptation sequence for use in the hybrid DFE structure of FIG. 1 embodying the principles of the invention.

The adaptation of both the ISI-DFE and the NP-DFE should occur in a sequential order. An illustrative order is shown in FIG. 5. Although not shown, the steps of FIG. 5 are assumed to be carried out in conjunction with a controller of receiver 20, (FIG. 3) e.g., a microprocessor. In step 300, only the ISI-DFE portion of the hybrid DFE of FIG. 4 is adapted. In particular, NP feedback filter 155 is disabled via an NP control signal on line 154. In this instance the value of the output signal of NP feedback filter 155 is presumed to be zero. Conversely, the adaptation of ISI feedback filter 125 and FF 105 is enabled via an ISI control signal on line 124. Consequently, during this first phase of training, effectively only an ISI-DFE is operating to remove any ISI present in the received training signal.

In particular, referring back to FIG. 4, the output signal from FF 105 is applied, via sampler 108, to adder 110, which, theoretically, subtracts the remaining portion of ISI removed by ISI feedback filter 125 from the output signal of FF 105. Adder 110 provides a signal on line 111. At this point, however, and as described earlier, colored channel noise is typically still present in this signal on line 111. The latter signal is applied to adder 115 and to adder 130 (described below). Since NP feedback filter 155 is disabled, there is no estimate of the colored channel noise present on line 156, i.e., the value associated with this signal is zero, and adder 115 simply passes through the signal from adder 110 to line 116. The signal on line 116 is applied to slicer 120. Slicer 120 selects a particular data symbol as a function of the mapping of the signal on line 116 to a point in a predefined constellation of data symbols (not shown). Slicer 120 provides a data symbol every T seconds, where 1/T is the data symbol rate. This data symbol is an estimate of the received symbol and is provided by slicer 120 on line 121 for processing by other receiver circuitry (not shown) to recover the actually transmitted data, in this case the data representative of the training signal.

The output of slicer 120 is also provided to ISI feedback filter 125 and adders 130 and 145. ISI feedback filter 125 predicts the amount of ISI present in the received signal and provides an IS I prediction signal to adder 110, via line 126. Adder 110, as described above, removes the remaining portion of ISI from the received signal by subtracting the ISI prediction signal from the output signal of FF 105.

Adder 130 subtracts the estimated data symbol provided by slicer 120 from the ISI-reduced signal present on line 111 to provide an error signal, e1, on line 131. The latter signal represents the amount of ISI error and channel noise that has not been corrected by the operation of either FF 105, ISI feedback filter 125, or noise feedback filter 155. Error signal e1 is used to adapt both FF 105 and ISI feedback filter 125 via multipliers 135 and 140, and is provided as an input signal to noise feedback filter 155 described below. It is assumed that the adaptation algorithms (not shown) of FF 105 and ISI feedback filter 125 conform to the use of MMSE, zero forcing, or it variations, as known in the art. Multiplier 135 multiples the error signal e1 by a constant, or step size, α1. The resulting signal provided on line 136 is used to adapt FF 105. The signal on line 131 is the input signal to noise feedback filter 155 (described below). Further the signal on line 131 is also provided to multiplier 140, which effectively multiples the signal e1 by the step size α2. The resulting signal provided on line 141 is used to adapt ISI feedback filter 125. α1 and α2 are commonly set to equal or comparable values. Step sizes α1 and α2 are much smaller than step size α3.

In step 310, a comparison is made between the value of error signal e1 and a predefined constant E1. The constant E1 represents a desired ISI error rate and can either be empirically determined for a particular type of communications channel, or can be set to a specified communications system requirement. In this example, it is assumed the E1 is equal to $10^{-7}$ for an uncoded case and $10^{-3}$ for a coded case. If the value of the signal e1 is greater than or equal to E1, the ISI-DFE continues to adapt in step 300. However, if the value of the signal e1 is less than E1, the NP-DFE portion of the hybrid DFE of FIG. 4 is enabled and the ISI-DFE and FF 105 at this time can either keep adapting or be frozen. However, NP feedback filter 155 is now enabled via the NP control signal on line 154. It should be noted that the ISI control signal on line 124 only controls the adaptation of FF 105 and ISI-feedback filter 125, these filters are still enabled and removing ISI based upon the coefficients values determined in step 300. In contrast, the NP control signal on line 154 controls the operation of NP feedback filter 154.

In this second phase, it is presumed that only colored channel noise remains to be filtered from the received training signal. This predictive portion of the colored channel noise is removed by the NP-DFE portion of the hybrid DFE of FIG. 4. In particular, adder 115 subtracts that portion of the colored channel noise predicted by the NP feedback filter 155 from the ISI-filtered signal present on line 111. As described above, the output signal from adder 115 is applied to slicer 120, via line 116.

Adder 145 subtracts the estimated data symbol from the input signal to slicer 120 to provide error signal e2 on line 146. This error signal represents the amount of remaining channel noise that has not been corrected by the operation of noise feedback filter 155. Error signal e2 is used to adapt noise feedback filter 155 and is provided as an input signal to multiplier 150. It is assumed that the adaptation algorithms (not shown) of noise feedback filter 155 conforms to the use of MMSE zero forcing, or its variations, as known in the art. Multiplier 150 multiples the error signal e2 by a step size, α3. The resulting signal provided on line 151 is used to adapt noise feedback filter 155.

Like step 310 described above, a comparison is made between the value of error signal e2 and a predefined constant E2 in step 330. The constant E2 represents a desired channel error rate and can either be empirically determined for a particular type of communications channel, or can be set to a specified communications system requirement. In this example, it is assumed that E2 is better than $10^{-7}$ in an uncoded case and better than $10^{-3}$ for a coded system. If the value of the signal e2 is greater than or equal to E2, the NP-DFE continues to adapt in step 320. However, if the value of the signal e2 is less than E2, the NP-DFE portion of the hybrid ends the initial adaptation process and proceeds to the communications phase.

As a result of this adaptation sequence, it should be observed that since the ISI portion of the signal was removed first, the resulting ISI coefficients as represented by $I(z)$ dominate the resulting NP coefficients as represented by $N(z)$, i.e., $I(z) \gg N(z)$. This feature will be further described below.

Figure 6:
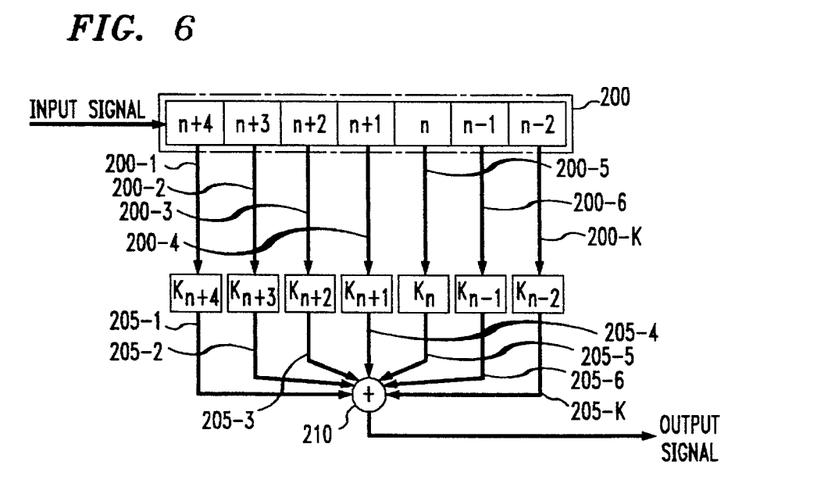
FIG. 6 is a block diagram of feedforward filter 105 of FIG. 1, embodying the principles of the invention.

In addition to sequencing the adaptation process, the performance of a hybrid DFE can approach the optimal performance if care is taken as to the design of the feedforward filter section. Generally, as known in the art, an adaptive filter is a delay line that includes a number of taps. Each tap represents a value of the received signal at a point in time, typically at intervals of T/k, where 1/T is the symbol rate and k is typically an integer and may be a fractional number. A generalized structure of FF 105 is shown in FIG. 6. FF 105 includes delay line 200, which includes K taps. The output of each tap is multiplied by a respective coefficient $K_i$, the values of which are adapted as described above. As known in the art, the "major tap" is the center tap and is associated with the "current" symbol at the FF output. In FIG. 6, the center tap is represented by tap n+1. Further, as known in the art, a feedforward filter performs both "pre-cursor" filtering and "post-cursor" filtering. Pre-cursor filtering represents that portion of ISI that occurs due to symbols received before the current symbol. Conversely, post-cursor filtering represents that portion of ISI that occurs due to symbols received after the current symbol. The post-cursor filtering is predictive in nature and is primarily performed by the ISI feedback filter of an ISI-DFE. The above-mentioned U.S. patent application of Gadot et al. recognizes that since the feedforward section also performs post-cursor filtering which corresponds to the span of the post-cursor tail of a "theoretical" matched filter, there is a tension between these two filters, i.e., the feedforward filter section fights with the ISI-feedback filter when the two filters are adapted. Consequently, it is desirable to lessen the amount of post-cursor filtering performed by the feedforward filter section. Therefore, and in accordance with the inventive concept, the "major tap" is shifted from the center tap so that the number of pre-cursor taps is greater than the number of postcursor taps. Typically, only a few symbols need be reserved in the feedforward filter section for post-cursor filtering. As shown in FIG. 6, taps that provide post-cursor filtering are provided by taps n−1, and n−2. (In addition, if desired to further lessen the amount of post-cursor filtering provided by FF 105, the step size $\alpha 1$, which is used to multiply error signal e1, can be further divided into two different step sizes: $\alpha 1_0$ and $\alpha 1_1$, where $\alpha 1_0$ is associated with the post-cursor filtering and is selected to be less than $\alpha 2$.) The result is that the post-cursor component of the error signal used to adapt post-cursor portion of FF 105 is less than the error signal used to adapt the ISI feedback filter 125. Consequently, FF 105 adapts slower to post-cursor error than ISI feedback filter 125.

As described above, the illustrative hybrid DFE of FIG. 4 becomes ISI coefficient dominating and approaches optimal DFE performance in the presence of channel distortion and noise. However, the problem of error propagation still exists. As mentioned above, the communications system of FIG. 3 utilizes the well-known method of precoding to reduce the affect of error propagation on the performance of a DFE. In this example, it is assumed that "Tomlinson" precoding, as known in the art is used in conjunction with the hybrid DFE of FIG. 4. An example of the precoder portion of transmitter 10 is shown in FIG. 7.

Figure 7:
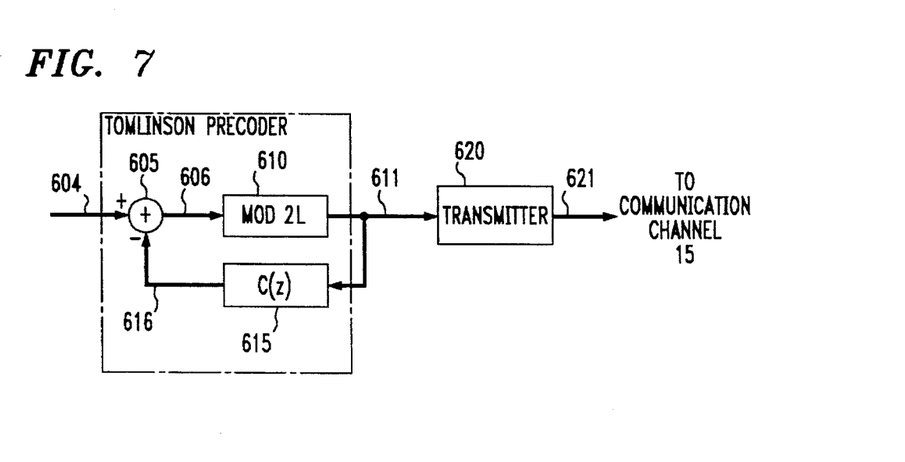
FIG. 7 is a block diagram of a precoder for use in transmitter 10 of FIG. 3.
Figure 8:
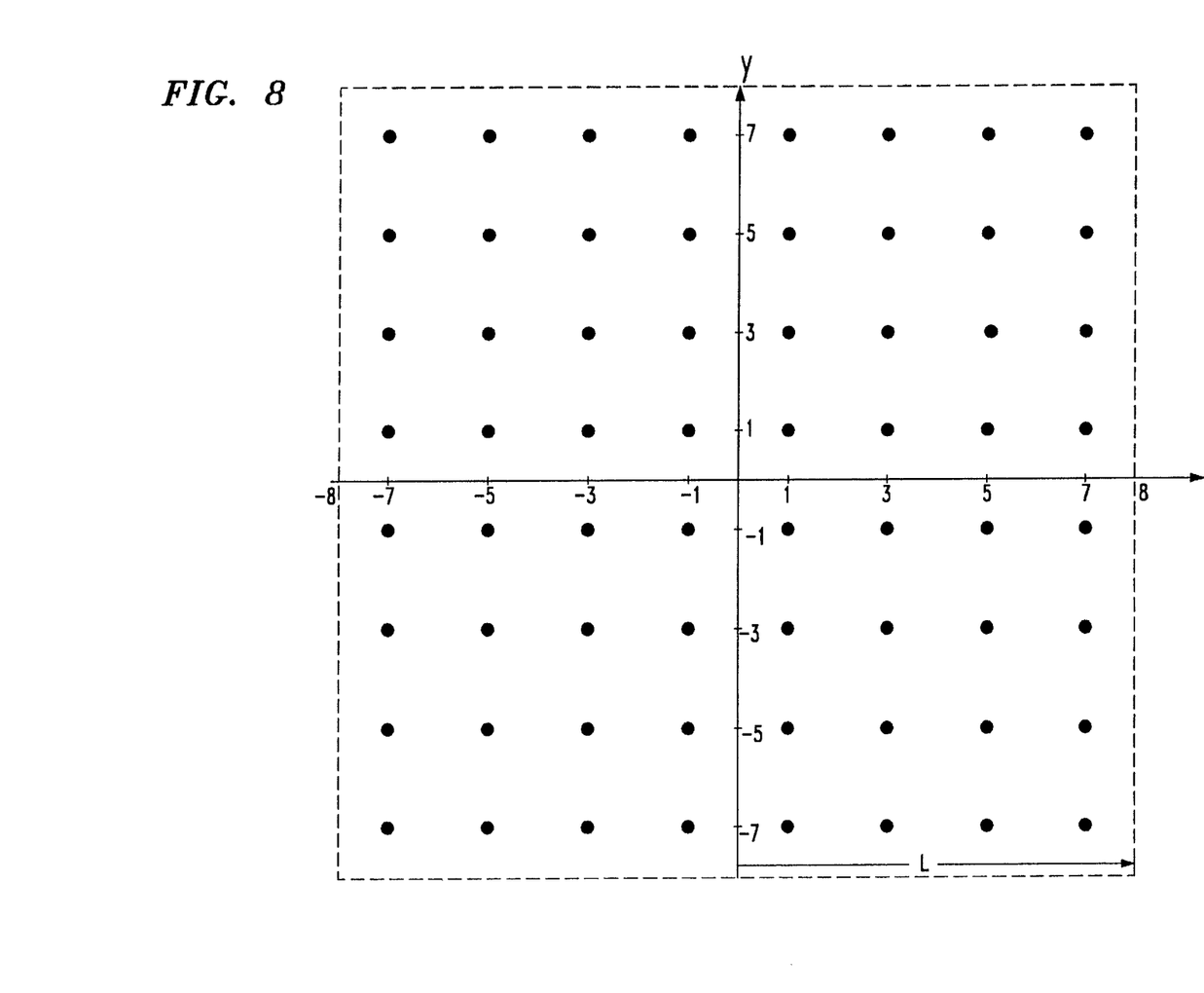
FIG. 8 is an illustrative signal point constellation.

In FIG. 7, a data signal is applied to a Tomlinson precoder comprising adder 605, mod-2L element 610, and filter 615. Other than the inventive concept, the Tomlinson precoder functions as in the prior art. In particular, adder 605 subtracts a signal developed by filter 615, described below, from the data signal. The output signal of adder 605 is applied to mod-2L element 610, which performs as known in the art, to provide an output data symbol stream on line 611 to transmitter 621. For example, mod-2L element 610 maps the output signal on line 606 to a position in a signal point constellation. This mapping is performed using modulo 2L arithmetic, where L is the size of a signal point constellation. FIG. 8 shows an illustrative signal point constellation, where L=7+1. Transmitter 621 includes the remaining portion of transmitter 10 and provides a modulated signal to communications channel 15. The output data symbol stream is also applied to filter 615, which filters this signal in accordance with the polynomial function, or filter response, C(z). The latter is transmitted from receiver 20 after the above described training phase, and represents the combination of the adaptation coefficients of $I(z)$ and $N(z)$.

As mentioned earlier, precoding is typically based upon adaptation coefficients determined during training. Once training is completed, these adaptation coefficients are sent back to the transmitter for use in the precoder. Consequently, since the precoder is now adapting for ISI and channel noise, the hybrid DFE structure of FIG. 4 must be modified. An illustrative modification for use during the communications phase is shown in FIG. 9, which shows a portion of receiver 20.

However, although the general technique of precoding is known in the prior art, i.e., that filter 615 (FIG. 7) must provide some filter response as a function of the adaptation of the hybrid DFE in the receiver, I have realized that a particular combination of adaptation coefficients allows the communications system of FIG. 3 to approach optimal DFE performance. In particular, to explain how to determine what coefficients are needed in the precoder when using a hybrid DFE, I have set up the following hypothetical situation. It is first assumed that the precoder coefficients are set to zero at the transmitter and the system response is observed. This system response is the basis for determining the precoder coefficients.

Figure 9:
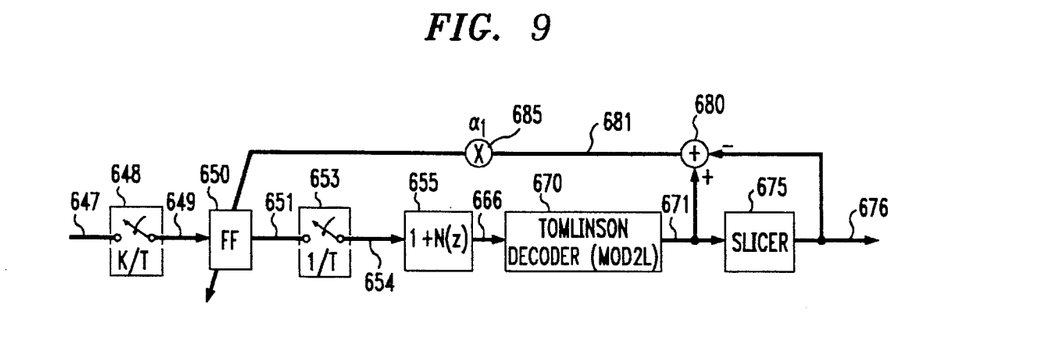
FIG. 9 is a block diagram of an embodiment of a hybrid DFE during the communications phase in accordance with the principles of this invention.

Referring to FIG. 9, at the output of feedforward filter (FF) 650, the system response is $1+I(z)$ since the post-cursor response remains uncorrected. That is, the output signal is the current symbol (represented by the number "1") plus post-cursor ISI. As noted earlier, a feedforward filter section introduces slightly colored noise. To whiten this slightly colored noise a $1+N(z)$ filter is used, represented by filter section 655. At this filter output, the system response is $(1+I(z))(1+N(z))$. Therefore, the residual response that a precoder needs to deal with is $$C(z)=(1+I(z))(1+N(z))-1, \qquad (1)$$

where, again, the number "1" represents the current symbol.

In light of equation (1), both $I(z)$ and $N(z)$ are calculated by receiver 20 and transmitted back to transmitter 10 during a respective training phase, where $I(z)$ and $N(z)$ are combined as shown in equation (1) to provide the filter response function for filter 615.

Referring back to FIG. 9, during the communications phase, a received precoded data signal is applied to FF 650. The latter is convolved with filter element 655, which has a filter response equal to $(1+N(z))$. The resultant output signal from filter element 655 is applied to Tomlinson decoder 670, which provides a sequence of data symbols to slicer 675. The latter provides an estimate of the transmitted data symbol to the remaining portion of receiver 20 (not shown). In addition, an error signal is developed by adder 680. This error signal is used to adapt FF 650.

Figure 11:
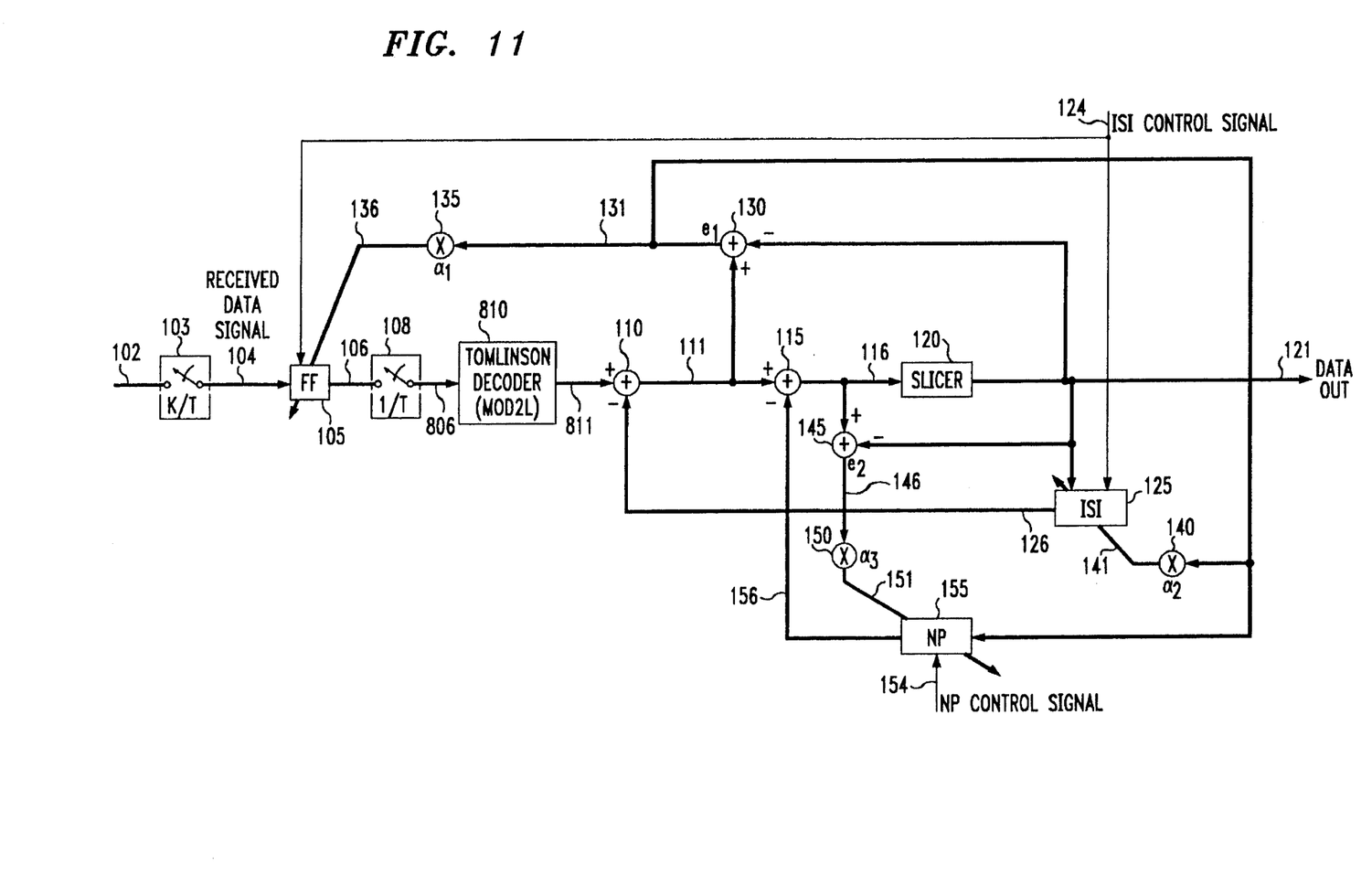
FIG. 11 is a block diagram of another embodiment of a hybrid DFE during the communications phase.

It should be noted that it may be desirable to continue to adapt the hybrid DFE to small changes in the communications channel response even during the communications phase. For example, crosstalk from neighboring cable pairs may affect the channel condition after training was accomplished. An illustrative hybrid DFE structure is shown in FIG. 11. In this example, the I(z) and N(z) coefficients of the hybrid DFE of FIG. 4 are reset to zero after training to allow for continued adaptation during the communications phase.

Although the above described precoding scheme utilizing equation (1) provides an improvement in the performance of a hybrid DFE, the above-mentioned U.S. patent application of Gadot et al. recognizes that it is not necessarily the most hardware-efficient way to combine coefficients for use in precoding.

In particular, as noted above, the hybrid DFE structure of FIG. 4 adapts according to the method of FIG. 5. In this method, the hybrid DFE first compensates for the presence of ISI in the received training signal. After the ISI compensation completes, the hybrid DFE compensates for any remaining channel noise. As mention above, this approach provides coefficients such that I(z) dominates N(z). Therefore, and in accordance with the principles of the invention, only the dominate tap values are used by the transmitter during precoding in the communications phase—which reduces transmitter complexity by the filter element 615 of FIG. 7. At the receiver, the hardware complexity is also reduced since there is no need to add 1+N(z) filter in the forward path. In the communications phase, the Tomlinson precoder circuitry of FIG. 7 is modified so that C(z)=I(z). In other words, Tomlinson precoding is performed as if only an ISI-DFE was present in receiver 20.

Figure 10:
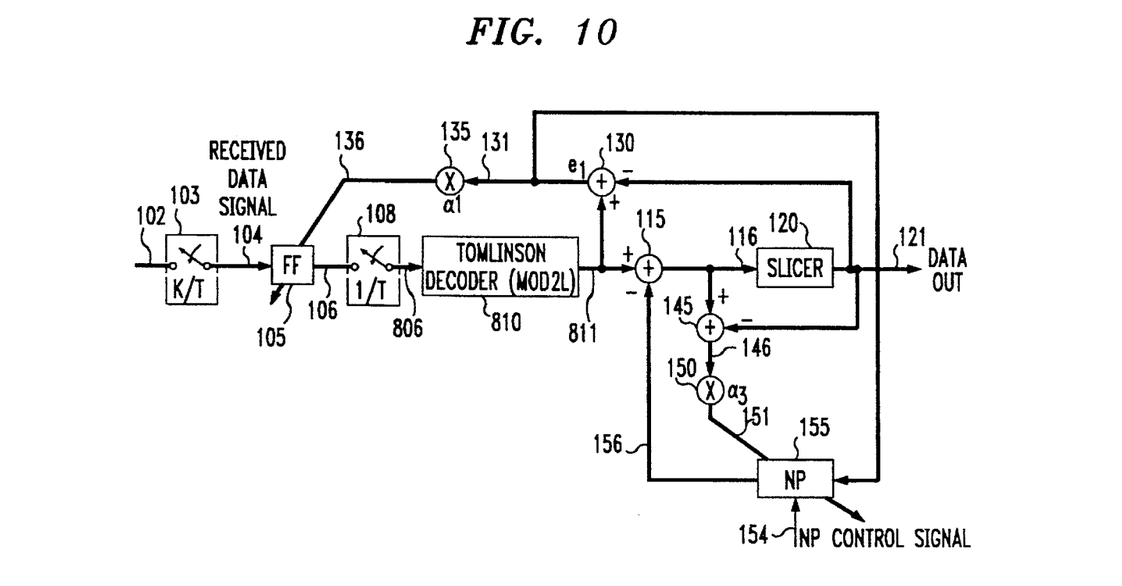
FIG. 10 is a block diagram Of another embodiment of a hybrid DFE during the communications phase.

Therefore, another illustrative embodiment of the invention is shown in FIG. 10, which provides a more practical solution to the realization of a hybrid DFE structure that approaches optimal performance. In FIG. 10, a portion of receiver 20 is shown during the communications phase. FIG. 10 is similar to FIG. 4 except for the removal of that circuitry associated with the ISI portion of the hybrid DFE, i.e., ISI-feedback filter 125, multiplier 140, adder 110, and the addition of Tomlinson decoder 810. Consequently, the NP-DFE portion of the hybrid DFE is kept active during the communications phase. Conveniently, the continued use of the NP-DFE in the receiver allows the receiver to track small changes in the channel during the communications phase.

Although the block diagram of FIG. 10 allows receiver 20 to track small changes in the channel response, it may be the case that larger changes in the channel response will occur. In this case, the feedback coefficients of FF 105 and NP-feedback filter 155 will increase in size. Although the communications system of FIG. 3 could simply perform a retrain in this situation, it would be beneficial to not recalculate the entire set of I(z) and N(z) coefficients and instead perform a "quick retrain."

Figure 12:
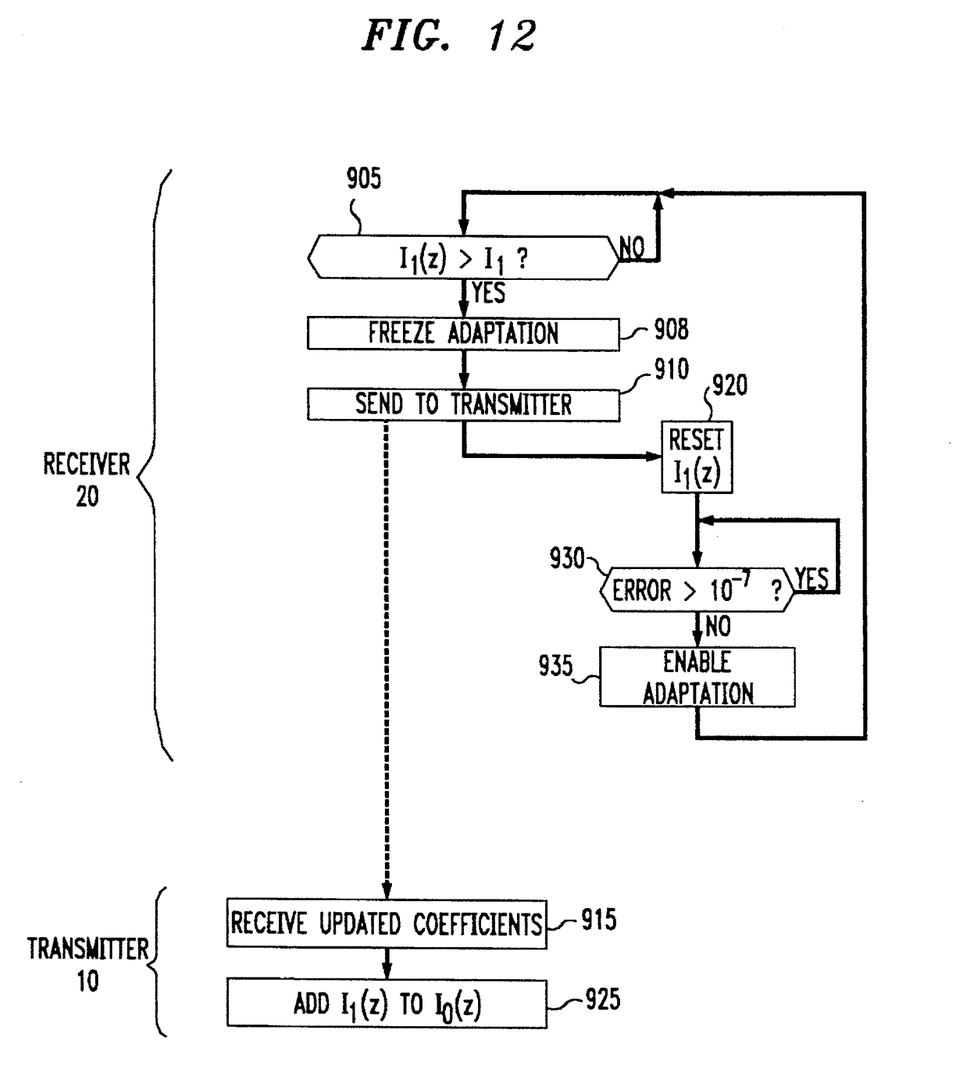
FIG. 12 is a flow chart of a retraining method.

FIG. 11 shows a block diagram of an illustrative hybrid DFE for performing a quick retrain. A corresponding quick retrain method is shown in FIG. 12. As described above, during the training phase, only the dominate I(z) coefficients have been transmitted back to a transmitter. In the transmitter, this initial set of coefficients is now represented by $I_0(z)$. Upon switching to the communications phase, the I(z) coefficients of ISI feedback filter 125 are reset to zero. In this example, both the ISI-predictive filter and the NP-predictive filter continue to operate in the communications phase. In step 905, receiver 20 periodically monitors the size of the coefficients of ISI feedback filter 125, as represented by $I_1(z)$, in comparison to a predetermined size $I_1$. When $I_1(z)$ is greater than $I_1$, receiver 20 notifies transmitter 10 that a "quick retrain" is about to be performed, freezes the ISI-predictive filter from further adaptation in step 908, and sends $I_1(z)$ to transmitter 10 in step 910. This notification can occur in any number of ways as known in the prior art, e.g., via a reverse channel used for sending control information. In step 920, receiver 20 resets $I_1(z)$ to zero. Since communication is still occuring, receiver 20 illustratively monitors the error rate in step 930 to determine when transmitter 10 has completed the quick retrain. When the the error rate is less than $10^{-7}$, receiver 20 enables adaptation of the ISI predictive filter and returns back to step 905.

Transmitter 10 receives the updated coefficient values, $I_1(z)$, in step 915 and simply adds $I_1(z)$ to the pre-existing $I_0(z)$ values in step 925. Consequently, a quicker retrain of the communications system has been accomplished.

It should be noted that an alternative method for a quick retrain can be implemented using the hybrid DFE structure of FIG. 10. In this instance, the N(z) values replace the I(z) values described in the method of FIG. 12. However, this approach adds additional complexity because once the $N_1(z)$ update is sent back to transmitter 10, the hybrid receiver structure of FIG. 10 must be modified to include a filter section similar to filter element 655 of FIG. 9.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., slicers, filters, etc., the functions of any one or more of those building blocks can be carried out using one or more appropriate programmed processors, e.g., a digital signal processor.

In addition, although the inventive concept was described in the context of using a hybrid DFE in which I(z) dominates N(z), it should be realized that an alternative approach could be used in which I(z) is small and N(z) is large. In such an alternative system, N(z) is used by transmitter 10 for precoding, and the NP-DFE portion of the hybrid DFE adapts before the ISI-portion of the hybrid DFE. The corresponding hybrid DFE structure during the communications phase should include a filter section similar to filter element 655 of FIG. 9, which whitens the colored noise.

Further, although Tomlinson precoding was illustrated, any precoding scheme can be used in conjunction with the inventive concept. For example, the precoding specified by CCITT modulation standard V.34 could also be used with correspondingly straightforward changes in the receiver structure. Finally, although a setup phase was used to illustrate the adaptation sequence, it should be realized that the inventive concept also applies to a "blind startup" procedure. This proposed scheme can be used in either an uncoded or coded communications system.

What is claimed:

1. Apparatus for use in data communications equipment, the apparatus comprising:

precoding means responsive to a data signal for providing a sequence of precoded data symbols; and means for transmitting the sequence of precoded data symbols to a receiver;

wherein the means for precoding further includes a feedback filter means for filtering the sequence of precoded data symbols, where the response function of the feedback filter means is equal to $(1+I(z))(1+N(z))-1$, where $I(z)$ is equal to a set of intersymbol interference decision feedback equalizer coefficients transmitted from the receiver and $N(z)$ is equal to a set of noise predictive decision feedback equalizer coefficients transmitted from the receiver.

2. Apparatus for use in data communications equipment, the apparatus comprising:

a filter means responsive to a sequence of precoded data symbols for providing a feedback signal; and a mapper responsive to a signal representative of a difference between a data signal and the feedback signal for providing the sequence of precoded data symbols for transmission to a receiver;

wherein the filter means has a response function equal to $(1+I(z))(1+N(z))-1$, where $I(z)$ is equal to a set of intersymbol interference decision feedback equalizer coefficients transmitted from the receiver and $N(z)$ is equal to a set of noise predictive decision feedback equalizer coefficients transmitted from the receiver.

3. A method for use in data communications equipment, the method comprising the steps of:

precoding a data signal to provide a sequence of precoded data symbols; and transmitting the sequence of precoded data symbols to a receiver;

wherein the precoding further includes a step of filtering the sequence of precoded data symbols in accordance with a filter response function equal to $(1+I(z))(1+N(z))-1$, where $I(z)$ is equal to a set of intersymbol interference decision feedback equalizer coefficients transmitted from the receiver and $N(z)$ is equal to a set of noise predictive decision feedback equalizer coefficients transmitted from the receiver.

4. A method for use in data communications equipment, the method comprising the steps of:

receiving a set of intersymbol interference decision feedback equalizer coefficients, $I(z)$, from a receiver;

receiving a set of noise predictive decision feedback equalizer coefficients, $N(z)$, transmitted from the receiver;

precoding a data signal to provide a precoded data signal for transmission to the receiver, where the precoded data signal is a function of $(1+I(z))(1+N(z))-1$.

5. A method for use in data communications equipment, the method comprising the steps of:

receiving a set of intersymbol interference decision feedback equalizer coefficients, $I(z)$, from a receiver;

receiving a set of noise predictive decision feedback equalizer coefficients, $N(z)$, transmitted from the receiver;

filtering a sequence of precoded data symbols to provide a feedback signal; and mapping a signal representative of a difference between a data signal and the feedback signal to provide the sequence of precoded data symbols; and transmitting the sequence of precoded data symbols to the receiver; wherein the filtering step filters the sequence of precoded data symbols in accordance with a filter response function equal to $(1+I(z))(1+N(z))-1$.

* * * * *